UNITED STATES PATENT OFFICE.

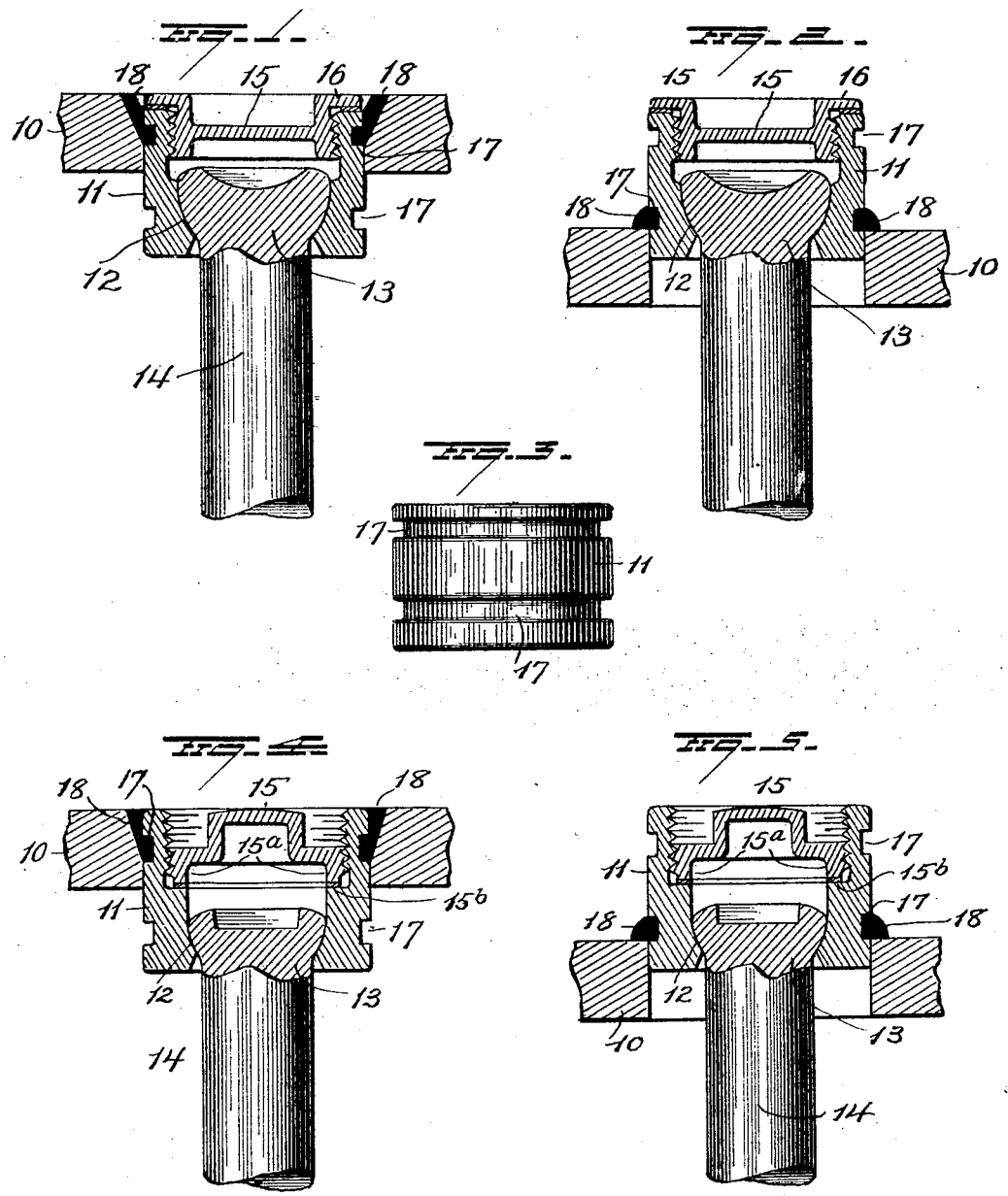

ETHAN I. DODDS, OF CENTRAL VALLEY, NEW YORK, ASSIGNOR TO FLANNERY BOLT COMPANY, OF PITTSBURGH, PENNSYLVANIA.

STAY-BOLT STRUCTURE.

1,410,004.  Specification of Letters Patent.  Patented Mar. 21, 1922.

Application filed February 16, 1921. Serial No. 445,458.

*To all whom it may concern:*

Be it known that I, ETHAN I. DODDS, a citizen of the United States, and a resident of Central Valley, in the county of Orange and State of New York, have invented certain new and useful Improvements in Staybolt Structures; and I do hereby declare the following to be a full, clear, and exact description of the invention, such as will enable others skilled in the art to which it appertains to make and use the same.

My invention relates to an improvement in staybolt structures and it consists in a bolt bearing member initially adjustable to any position within the bolt opening in the boiler sheet, and then permanently secured within said opening and provided with a removable cap to permit of the ready inspection of the bolt.

It further consists in the parts and combination of parts as will be more fully explained and pointed out in the claims.

In the accompanying drawings; Figures 1 and 2 are views in section showing two adjustments of the bearing member in the boiler sheet; Figure 3 is a view in elevation of the bearing member and Figures 4 and 5 are views in section similar to Figures 1 and 2 of a modified construction.

10 represents a boiler sheet provided with a boiler opening which may be cylindrical as shown in Figure 2, or beveled or counterbored at its outer edge as in Figure 1, and 11 is the bolt bearing member mounted in said sheet. The bolt bearing member is cylindrical in shape externally and of a diameter slightly smaller than the bolt opening so that it may be adjusted to any position therein, and is provided internally adjacent its lower end with a curved seat 12 for the head 13 of the bolt 14, and with an opening for the passage of the bolt. The outer end of the bolt bearing member is open and internally threaded to receive the cap 15, which is externally threaded to engage the threaded end of the bolt bearing member 11, and the cap of the bolt bearing member is also provided with a peripheral flange 16 which rests on a gasket seated on the upper end of the bearing member 11 as shown in Figure 1, or the cap may be constructed as shown in Figures 4 and 5 with a depending flange 15$^a$ which rests on a shoulder 15$^b$ formed with the bearing member.

As before explained the bearing member 11 is cylindrical in shape, or is of such shape that it may be adjusted to any position within the bolt opening, and it is provided with a plurality of peripheral grooves 17 in which a welding compound is fused as at 18 to permanently secure it to the sheet, the grooves being so located that one of them will be accessible for the welding material irrespective of the position of the bearing member.

In assembling the parts, the bearing member is applied to the bolt 14 and the inner end of the latter is then secured to the inner sheet of a boiler either by screwing it into the sheet or upsetting the end of the bolt against the outer face of the inner sheet (not shown) in the usual and well known manner. After the bolt has been properly secured to the inner sheet, the bearing member 11 is pulled outwardly until its seat 12 is in close contact with the curved head of the bolt and it is so held until it has been permanently secured in place by welding as above explained. With this construction it will be seen that bolts of one size may be used to connect boiler sheets at varying distances apart, as the bearing member may rest wholly within the bolt opening as in Figures 1 and 4, for the maximum distance between the boiler sheets or may project nearly their full depth as shown in Figures 2 and 5 for boiler sheets that are closer together, thus permitting one size of bolt to be used where several sizes were formally required.

Again by making the bolt bearing member of less diameter than the bolt opening in the sheet and securing it to the latter by a peripheral weld engaging a peripheral groove in said member, the latter cannot be displaced inwardly under any stress except by shearing the weld. Again the bolt has a universal movement in the bearing member and is free to be assembled at right angles or oblique to the boiler sheets and is accessible, upon the removal of the cap 15 to be inspected at any time.

Having fully described my invention what I claim as new and desire to secure by Letters-Patent, is:—

1. In a stay bolt structure, the combination of a boiler sheet having a bolt opening through the same, a bolt bearing member having an opening therethrough for the bolt and an internal seat for the head of a bolt, the said member being of less diameter than the bolt opening in the boiler sheet and adapted to be initially adjusted therein to properly engage the head of the bolt and then permanently secured to the sheet by welding and a cap closing the outer end of said bearing member.

2. In a stay bolt structure, the combination of a boiler sheet having a bolt opening through the same, a bolt bearing member having an opening therethrough for the bolt; an internal seat for the head of the latter and a plurality of peripheral grooves, the said member being of less diameter than the bolt opening in the boiler sheet and adapted to be initially adjusted therein to properly engage the head of the bolt and then permanently secured to the boiler sheet by welding, and a cap closing the outer end of said bearing member.

3. In a stay bolt structure, the combination of a boiler sheet having a bolt opening through the same, a bolt bearing member having an opening therethrough for the bolt, and an internal seat for the head of the bolt, the said member being of less diameter than the bolt opening in the boiler sheet and adapted to be initially adjusted therein to properly engage the head of the bolt and then permanently secured in its adjusted position by welding and a cap closing the outer end of said member and provided with a flange contacting therewith to form a steam tight joint.

In testimony whereof, I have signed this specification in the presence of a subscribing witness.

ETHAN I. DODDS.

Witness:
EDWIN S. RYCE.